United States Patent
Crossno

(10) Patent No.: US 8,502,672 B1
(45) Date of Patent: Aug. 6, 2013

(54) METHOD AND APPARATUS FOR PERFORMING PREDETERMINED ACTIONS BY A DEVICE UPON COMPLETION OF GIVEN JOB FUNCTIONS

(75) Inventor: Adam Crossno, Flower Mound, TX (US)

(73) Assignee: OnAsset Intelligence, Inc., Irving, TX (US)

( * ) Notice: Subject to any disclaimer, the term of this patent is extended or adjusted under 35 U.S.C. 154(b) by 362 days.

(21) Appl. No.: 12/857,345

(22) Filed: Aug. 16, 2010

(51) Int. Cl.
*G08B 13/14* (2006.01)

(52) U.S. Cl.
USPC ............ 340/572.1; 340/572.2; 340/572.4; 340/572.7; 340/572.8

(58) Field of Classification Search
USPC ............................ 340/527.1–572.7
See application file for complete search history.

(56) References Cited

U.S. PATENT DOCUMENTS

| | | | |
|---|---|---|---|
| 6,982,656 B1 * | 1/2006 | Coppinger et al. | 340/988 |
| 7,486,174 B2 * | 2/2009 | Battista et al. | 340/425.5 |
| 2006/0071786 A1 * | 4/2006 | Fano | 340/539.22 |

\* cited by examiner

*Primary Examiner* — Tai T Nguyen
(74) *Attorney, Agent, or Firm* — Bruce C. Lutz

(57) ABSTRACT

A method and apparatus is provided for initiating procedures whereby a smart device is able to analyze situational data sensed by the device, compare one or more event signatures representative of the sensed data with one or more sets of event signatures in a library of event signatures to logically determine completion of a job function and to then cause a specific action to be taken.

18 Claims, 4 Drawing Sheets

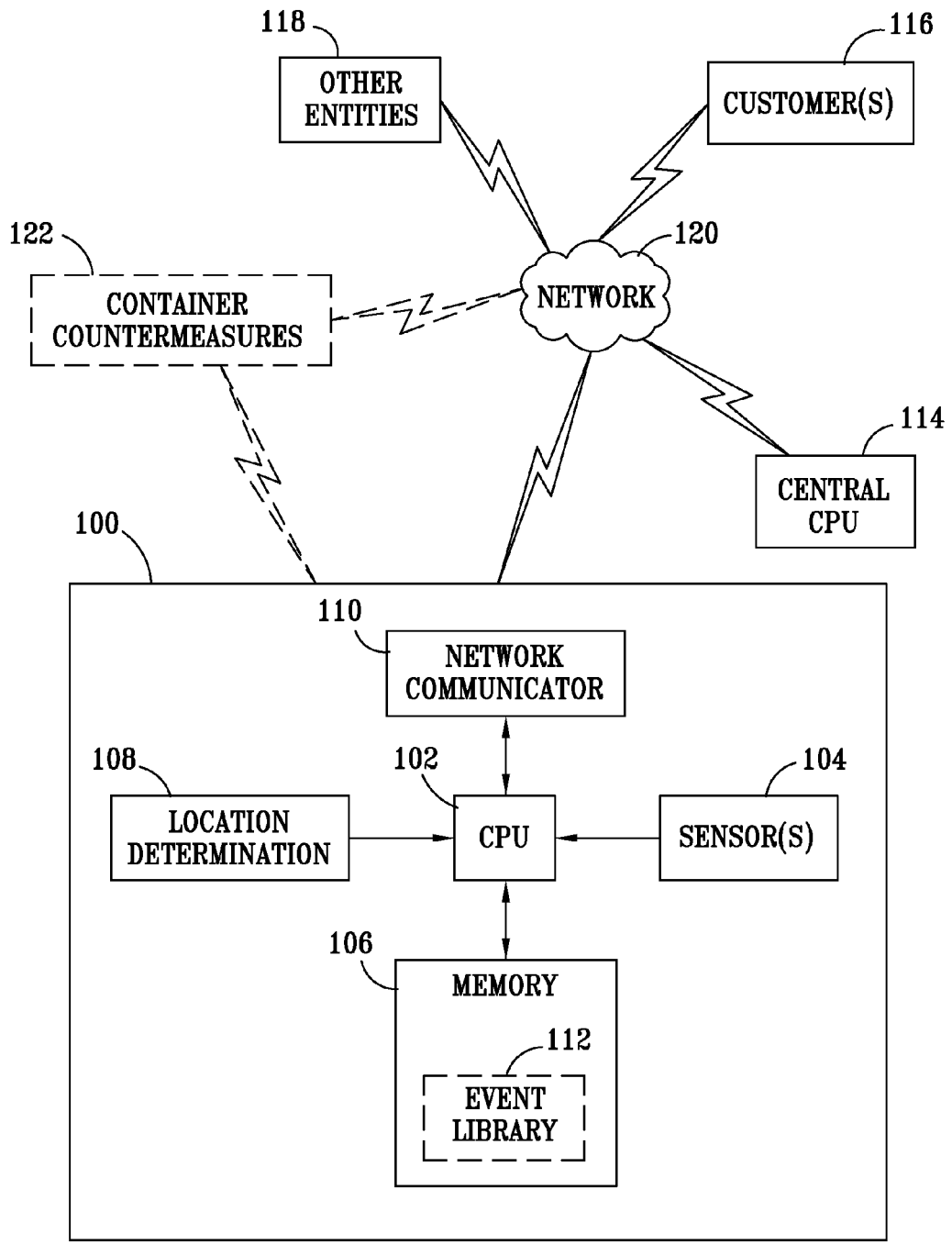

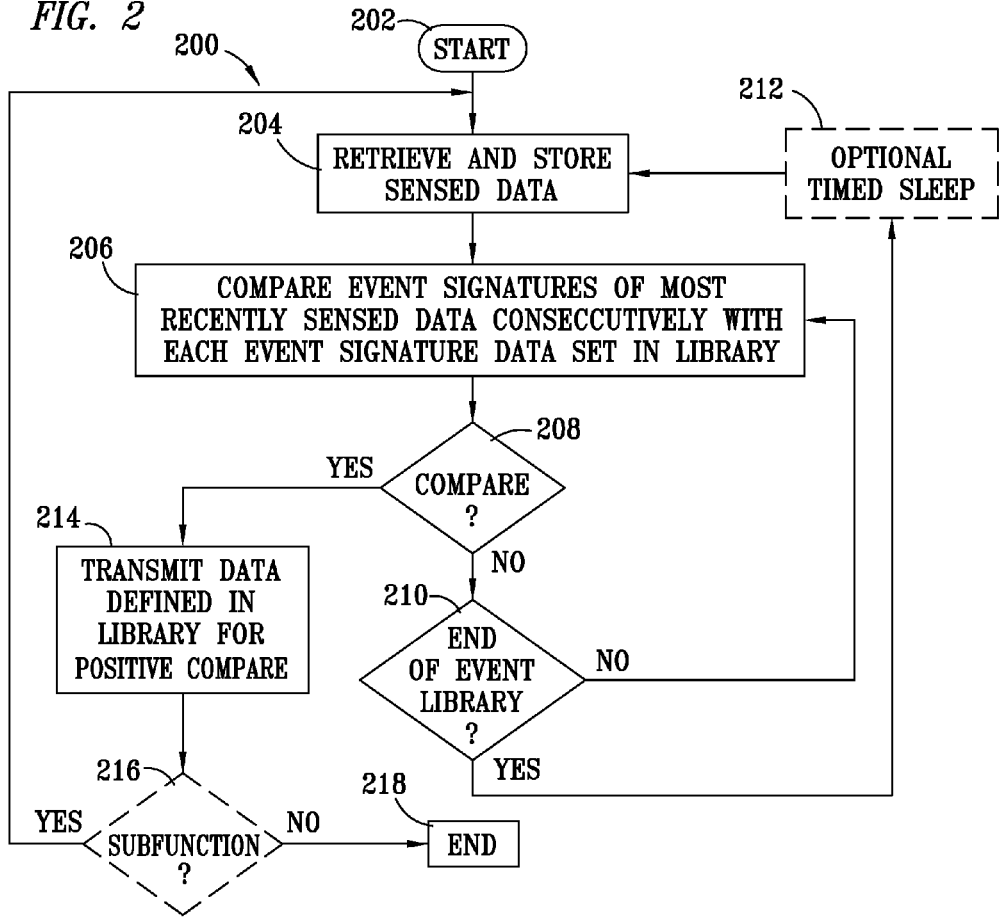

| IN GF? | SET LOC? | CONT OPEN? | RM FROM CONT? | MOVE ? | TIME | ACTIONS |
|---|---|---|---|---|---|---|
| Y | A | Y | Y | N | 3 | RETRIEVE NEXT DESTINATION DATA FROM CENTRAL CPU AND CHECK FOR NOTIFICATION OF DELIVERY SERVICE OF PICKUP PARTICULARS |
| Y | B | Y | Y | N | 6 | RETRIEVE NEXT DESTINATION DATA FROM CENTRAL CPU AND CHECK FOR NOTIFICATION OF DELIVERY SERVICE OF PICKUP PARTICULARS |
| Y | C | Y | Y | N | 12 | NOTIFY DELIVERY SERVICE OF PICKUP PARTICULARS FOR RETURNING TO CENTRAL WAREHOUSE |
| N | N | Y | Y | X | X | SEND SENSED DATA TO PREDEFINED ENTITIES AS POTENTIAL THEFT |

FIG. 4
| TRIP LOC? | DIS- CONN? | SOFT CONN | HARD CONN | CONT OPEN? | RM FROM CONT? | PALLET LIFT? | DEST? | GEOF | ACTIONS |
|---|---|---|---|---|---|---|---|---|---|
| Y | A | YN | YN | YN | YN | YN | N | Y | NOTIFY |
| Y | B | YN | YN | YN | YN | YN | N | Y | NOTIFY |
| Y | C | X | X | X | X | X | Y | X | SELECTIVE NOTIFY |
| | | | | | | | | | |
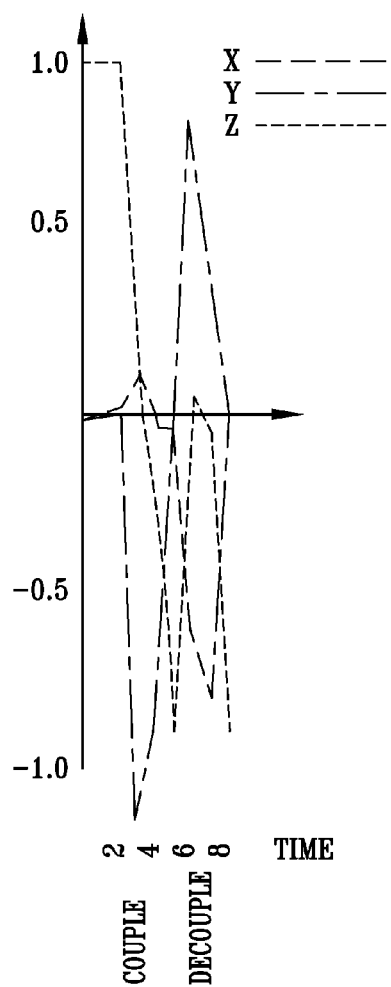
FIG. 5A
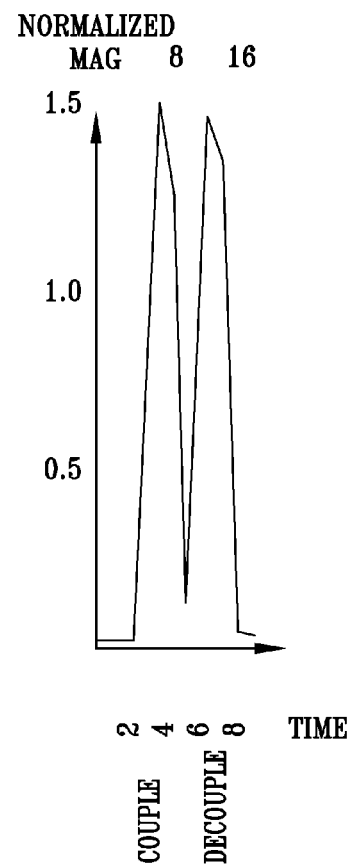
FIG. 5B

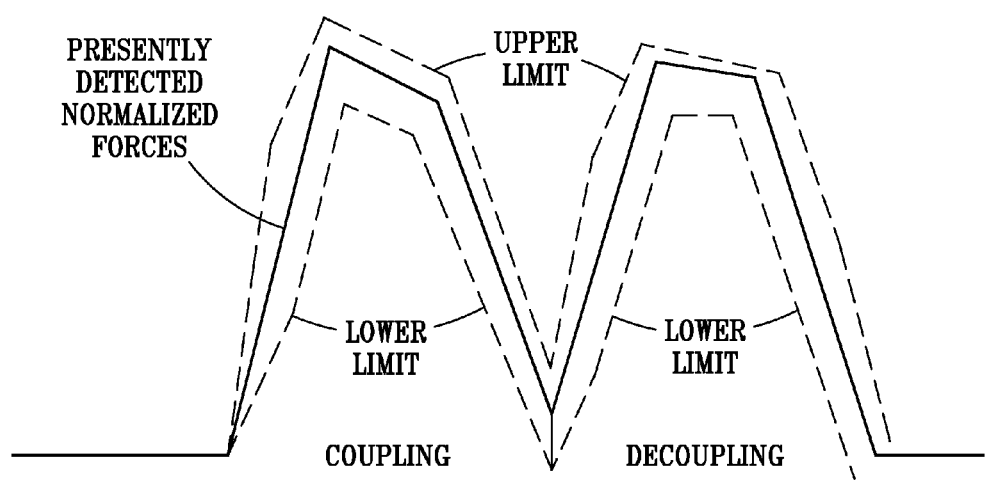

METHOD AND APPARATUS FOR PERFORMING PREDETERMINED ACTIONS BY A DEVICE UPON COMPLETION OF GIVEN JOB FUNCTIONS

FIELD OF THE INVENTION

The present invention relates generally to a smart device that is able to determine, through an analysis of recently sensed conditions and one or more event signatures obtained from these sensed conditions as compared to event signatures in one or more sets of event signatures in a library of event signatures, that a given job function has been completed and that the smart device should then perform one or more actions upon said determination in accordance with the set of event signatures to which a positive comparison is made.

BACKGROUND

Automation of procedures has advanced dramatically in recent years. However, many times procedures come to a standstill because there are not enough personnel available to observe and/or perform something that needs to be performed.

As an example, when renting a device such as a container tracking device to a customer there are often personnel problems involved with getting the device promptly returned for reprogramming or for forwarding to a next customer wanting to use the device. The problems may be lack of customer personnel to accomplish the return procedures involved, packaging the device properly, getting the correct address on the packaged device when forwarding, contacting a delivery service to pick up the package and so forth.

As another example, theft of assets through removal from a container or even theft of an entire container is becoming increasingly common. When the theft occurs in a truck stop parking lot, often the thieves disconnect the trailer from the tractor and reconnect to their own tractor. They try to do this with minimal noise and the forces, termed herein as an event signature, are quite different from the very fast and typically noisy operation involved when the procedure is accomplished after forcing the stopping of a truck on the open road. At times, pallet moving devices, such as powered forklifts or manually operated units, are used to transfer assets from a hijacked truck to another vehicle. The event signature forces and sensor triggers involved when such a transfer occurs are reasonably reliably differentiated from other event signature forces applied to a container using appropriate motion analysis circuitry and/or pattern recognition algorithms as applied to a series of sensed force values. Since the truck driver, and even additional security personnel associated with a given delivery, may well be incapacitated by the thieves, the driver and/or these additional personnel cannot be relied upon to quickly report the theft.

It would thus be desirable for a device to be smart enough, through the use of sensors and artificial intelligence to determine or otherwise ascertain that the device has accomplished (finished) an assigned task and then, in the case of the first example supra, to notify a delivery service directly using M2M (machine to machine) communication to pick up the device for transfer to another destination. As part of the notification it would also be desirable to include details such as whether or not the device needs to be packed in a container by the delivery service, the minimum container size required, the destination, the party to be charged for the delivery, the priority to be assigned to the delivery and so forth. It would also be desirable that the device could transmit, as part of the notification data, one or more forms to, as examples, cause a printer to generate a shipping label and/or an invoice for delivery of the asset to which the device was attached whereby the delivery service could drop off the invoice when picking up the device for delivery to the next destination.

In the situation of the second example, it would be desirable to be able to use a monitoring device to determine that event signatures associated with removal of assets from an attached container at a location other than one or more pre-defined unloading locations or other event signatures that are typically indicative of the theft of the entire container, is likely to constitute a theft situation whereby the monitoring device has completed a job function when contacting appropriate authorities that theft is likely occurring. Additionally, it would be desirable to be able to alternatively instruct the monitoring device to take other or further theft countermeasure action such as triggering the operation of one or more cameras, spraying the assets with a dye, activating an audible alarm, causing the dispersing of a debilitating gas cloud and so forth in order to complete the job function.

SUMMARY

The present invention comprises a smart device that is able to compare a plurality of presently and/or recently sensed data values that have been converted to equivalent event signatures using time waveform analysis of a series of sensed data values or other sensed data manipulation to establish an event signature with one or more sets of event signatures in a library of event signatures to determine completion of a job function and to then cause a specific action to be taken.

An example of such would be a RF tracking device that is typically rented or short term leased to a customer or is otherwise used for a specific job function and/or a series of job subfunctions within an overall job function. The device upon completion of the job function, as determined by the device, is able to request a delivery service to pick up the device and transport it to a new destination, from the present location via M2M communication. The determination of completion of the job function (or job subfunction) is accomplished by comparing the event signatures of recently sensed conditions to which the tracking device is subjected with a library of one or more set(s) of event signatures related to one or more job function completion scenarios. Upon such a determination, the device then performs one or more actions associated with that set of event signatures to which a positive comparison was obtained.

As another example, and as briefly mentioned supra, the job function (or subfunction) of a smart device may be to monitor forces to which a container is subjected and when an analysis of the monitored forces produces a set of event signatures that positively (or even probably if a user prefers) coincides with a set of event signatures in a library accessed by the device, a communication is generated to appropriate authorities that theft of assets in said container is likely to be occurring. Such a communication may also include other sensed data relative the situation such as location, direction of movement, if any, and so forth. The device may alternatively or in addition implement counter-measures such as spraying the assets in the container with a dye or activating cameras to record incidents occurring as part of the theft and so forth.

BRIEF DESCRIPTION OF THE DRAWINGS

For a more complete understanding of one or more embodiments of the present invention and the advantages thereof, reference is now made to the following descriptions taken in conjunction with the accompanying drawings, in which:

FIG. 1 illustrates an exemplary smart device having typical components and a typical communication network used thereby;

FIG. 2 illustrates a very high level flow diagram of programming that may be used by a smart device of the present invention when there are multiple event signature scenarios that may be used to initiate different actions when a job function is completed or otherwise terminated;

FIG. 3 illustrates an exemplary table of event signatures that may be compared with presently sensed data obtained by a smart tracking device to determine subsequent actions initiated by said smart device such as pickup and delivery to a new location;

FIG. 4 illustrates an exemplary table of event signatures that may be compared with presently sensed data obtained by a smart device to determine subsequent actions initiated by said smart device upon detection of event signatures signifying the likelihood of theft of a container or the goods in a container;

FIGS. 5A and 5B illustrate waveform representations of forces detected by a smart device when coupling and then immediately uncoupling a tractor to and then from a trailer; and FIG. 6 comprises an expansion of the waveform of FIG. 5B to illustrate that a given event signature may still be positively compared within given deviation parameters.

DETAILED DESCRIPTION

For purposes of this invention, M2M communication includes any machine to machine communication that is initiated by a machine as a result of the detection of conditions by that machine that correspond to one or more pre-established situations. The receiving apparatus or machine may include any computer type device that can react to the communication including telephones and cell phones. As defined herein, the completion of a given job function (or subfunction) and a resulting action comprises detecting a present event signature or set of event signatures, obtaining a positive comparison of the present event signature(s) to at least one event signature or set of event signatures in a library of event signatures and then taking an action appropriate to that set of event signatures. While the action will typically include M2M communication, a smart device that is expected to travel for an extended period of time on a container ship, may complete a first job subfunction in determining that the device has been subjected to forces commensurate with those encountered when a crane has lifted the assets to which the device is attached, and then upon determining that forces to which the device is subjected are commensurate with the movement of a ship while in the water places the device in a different mode of operation. This new mode of operation may be to stop reporting location and instead to log data until the device detects a situation such as unloading from the ship or opening of a container to which the device is attached. The job subfunction in this case being to conserve battery life since the location reporting uses many times the battery power of merely logging data.

It is believed appropriate to mention that an event signature as set forth herein may be obtained from a single detected value as well as a set of values detected over a period of time wherein the set of values is analyzed to obtain a set of data that can be readily compared to other similarly obtained data that now resides in a library of event signatures. When a set of data points can be obtained that are sufficiently high in frequency compared to the motion being detected, the analysis will typically be some form of a pattern recognition algorithm or wave analysis such as may be accomplished using FFT (fast Fourier transform). Other sets of data points may require other forms of manipulation to provide an event signature that can be used in a library of event signatures for comparison purposes.

It should also be mentioned that when a reference is made of a communication to authorities, the term authorities may be applied to a system operator and/or any other entity with a need to know including, but not limited to insurance agents, customers, shipping agents, and law enforcement agents.

Referring now to FIG. 1, a block 100 represents a RF (radio frequency) device of the present invention. As shown, the block 100 includes a CPU 102, one or more sensors 104, memory 106, location determination circuitry 108 and a network communicator 110. A typical RF device of the present invention may well include acceleration, temperature, light, container contact and other sensors as required for a given application. The memory 106 may optionally include an event signature library 112 as shown although the event signature library may be situated anywhere that the device can interrogate via network communication block 110. The memory 106 may be any combination of permanent and temporary storage. The location determination circuitry 108, although typically a GPS receiver, may be any form of location determining means such as cell phone tower triangulation, detection of specifically known nearby low power RF transmitters and so forth. The network communicator 110 will typically be a RF transceiver but may comprise any form of wireless communication mode that may be available. The device 100 will normally communicate with a central CPU 114 as well as any customers 116 and other entities 118 through one or more networks illustrated as a cloud 120. The other entities may be law enforcement agencies, insurance agents, pickup and delivery services or any other entities the device 100 may need to communicate with as part of a given job function. In some instances an entity, such as an involved shipping or insurance agent, may want to equip an asset transportation container with theft countermeasure devices such as video cameras, sirens, asset marking spray devices and so forth. When these countermeasure devices are connected to a control panel that includes wireless reception capability, the present invention may be used to activate one or more countermeasures upon a determination that theft is likely occurring. Thus a dash line block 122 labeled countermeasures is illustrated as receiving instructions from one or both of the tag 100 and the network 120.

Reference will now be made to FIG. 2 in combination with FIG. 1. A flow diagram 200 is presented as representative of one of a plurality of programs that may be simultaneously running on CPU 102. As shown, the program advances from a start condition 202 to a block 204 where data being sensed by sensors 104 as well as by location block 108 is retrieved by CPU 102 and stored temporarily or otherwise in a portion of memory 106. The program then advances to a block 206 where one or event signatures representative of the recently retrieved data are compared with an initially flagged first set of data obtained from an accessible event signature library. This library will be discussed further in connection with FIG. 3. If, in a compare decision block 208, it is determined that the flagged first set of data in the library does not reasonably compare with the recently retrieved data, the program advances to an end of event library decision block 210. If a table pointer, as set in connection with block 206, is not already at the last set of data in the library, the process returns to block 206 to flag and obtain the next set of data for comparison in connection with block 208. On the other hand, if, in decision block 210, it is determined that all the sets of data in the library have been examined, the process will return to block 204 to repeat the examination and compare process unless an optional timed sleep step is included as shown by dash line block 212. If, during the compare step 208, a positive comparison is obtained, the process goes to a block 214 to transmit data to one or more entities in accordance with action defined in connection with data in the presently flagged set of event signature data in said library. An optional decision block 216 may be used between block 214 and a final block 218 when the smart device is designed to potentially provide subfunctions. This decision block 216 may return the program to retrieve data block 204 for further action and event sensing under certain defined conditions or in all but certain defined conditions.

In certain situations it may be desirable to notify a first authority that there is a likelihood that an event is occurring but that not enough data has been obtained to be positive. An example might be where an uncoupling is detected in early morning hours in a truck stop location when typically a driver would be sleeping. When motion is immediately thereafter detected that coupling has occurred, and especially if combined with location data indicating a direction of travel that did or would soon deviate from staying within a prescribed geofence, such a combination of event signatures would positively coincide with a theft event signature. In this situation, the notification may be transmitted to further entities such as law enforcement personnel in addition to the first authority mentioned supra.

As mentioned above and in reference to FIG. 3, an exemplary library of event signatures for a customer having three normally used destinations A, B and C is shown. As illustrated, at least three types of events are being monitored by the device 100. The monitored data is periodically compared with each event signature in each of the three sets of event signatures shown. When a set comparison is positive, the CPU takes action as defined in an action section accompanying a given data set. However, action may be initiated even when only one event comparison in a set is positive as explained further infra.

As shown, a first column corresponds to whether or not the device is presently within a predefined geofence. In other words, whether or not the vehicle carrying the device has been diverted from one or more prescribed paths or roadways typically used to transport assets for this customer. While such diversion could be due to redirected traffic caused by road construction, more typically such diversion would be due to theft of the transportation vehicle to which the assumed tracking device 100 is attached. The second column of data corresponds to whether or the device is presently physically located in one of the customer's three predefined destination locations A, B or C. The third column corresponds to whether or not the device has detected a condition indicative of the container being opened either by a door or cutting open a side or roof of a container. An example of the detection technique might involve the use of a light sensor for the interior of the vehicle container to which the device is attached. Obviously, other sensors such as motion sensors and so forth may also be used. It is assumed in the top three event signatures shown that the container is never to be opened prior to arriving at one of the customer's locations A, B or C. It is also assumed, for this description of operation, that once light is detected, that sensor permanently provides a light indication until reset even though light is no longer detectable. The fourth column corresponds to a sensed indication that the device is no longer attached to an asset such as the vehicle container. The fifth column corresponds to a sensed indication by the location block 108 that the device is stationary or moving whether or not attached to the asset. The sixth column corresponds to time in hours passing since one or more of the previous detected events occurred. For purposes of this explanation of operation, it will be assumed that it is the time since the device was physically removed from the container or other asset to which it was originally attached. As will be apparent from an examination of the table, the seventh column comprises instructions to be initiated by the CPU 102 when the sensed conditions match a given event signature set. Within the table of FIG. 3, a "Y" corresponds to a yes or positive indication, a "N" corresponds to a no or negative indication and a "X" corresponds to either a positive or a negative indication. In other words, for that event set, it does not matter what indication is provided by a given sensor for that particular situation.

In the first event signature row of the library illustrated in FIG. 3, the events conform to a situation where the device is located within the predefined geofence, is at the customer's location A, the container has been opened, the device has been removed from the container, the device is not presently being moved and the time since the device was removed from the container exceeds 3 hours. As indicated in the first row action block, the device communicates with an authority such as the central CPU 114 to ascertain if the device should be returned to a warehouse for reassignment and reprogramming or if it should be presently reprogrammed and delivered to a new customer at a given new destination. While not critical to the operation of the present invention, it should be realized that instructions from the central CPU 114 may indicate that the device is to be reused by personnel at location A for attachment to a vehicle or other asset going elsewhere and thus the device would not, in this situation, notify the delivery service for pickup.

Referring now to the second event signature row of the library illustrated in FIG. 3, the events conform to a situation where the device is located within the predefined geofence, is at the customer's location B, the container has been opened, the device has been removed from the container or other asset, the device is not presently being moved and the time since it was removed from the container or other asset exceeds 6 hours. The difference in time assigned to this event signature may be because the customer has indicated there is more activity at location B than at location A and thus the device needs to wait longer before contacting the central CPU to determine further activity.

Referring now to the third event signature row of the library illustrated in FIG. 3, the events conform to a situation where the device is located within the predefined geofence, is at the customer's location C, the container has been opened, the device has been removed from the container or other asset, the device is not presently being moved and the time since it was removed from the container or other asset exceeds 12 hours. The difference in time assigned to this event signature may be because the customer has indicated there is more activity at location C than at locations A and B and that the personnel at location C have the capability to reprogram an incoming device for use in another application of the device and thus if it has not been reprogrammed within 12 hours, the device is not needed and can be returned to a rental entity central location for use by another customer.

Referring now to the fourth event signature row of the library illustrated in FIG. 3, the events conform to any situation where the device is no longer located within the predefined geofence and is not at any of the customer's locations.

If the container has been opened or if motion detection indicates that the device has been removed from the container or other asset a notification is sent to at least the central CPU that there may well be a problem. As shown, this notification would typically include any data sensed at the time of the notification. As mentioned previously, such a notification that theft is likely to be occurring may be sent even within the travel geofence when an event signature provides an indication that the device is being removed from the container at a location other than the customer's locations A, B and C.

While not specifically shown in the action portion of FIG. 3, an action that may optionally be taken when it is determined that it is likely that theft is occurring is to transmit a command to the countermeasures block 122 to activate one or more devices and/or change the frequency of pictures being taken when the device being commanded is a still camera and an initial determination is merely that it is only "possible" that a theft is occurring. When a more positive determination is made that a theft is occurring, a different command may be sent to activate further devices such as an asset spray marking device.

It should be noted that, if the truck has been diverted for verifiable reasons, the container has been opened for appropriate verifiable reasons or the device has been removed from the container for appropriate verifiable reasons, the device may be designed to be reset remotely to continue the original job function examination as previously explained for notifying a pickup and delivery service. As will be realized, many more event signatures may be compared and each event signature may initiate different or identical actions in accordance with customer desires. In conjunction with the above, the action defined in the library may be dynamic. In other words, the smart device, after delivering a message, may await a response and take a first additional set of actions if a first specific key is pushed and take alternative actions if other specific keys are pushed on a computer type keyboard or cell phone keypad at a remote location. In such a scenario it should be understood that the invention contemplates the fact that external actions (such as a system user inputting data dynamically) may influence the specific response from the system. In other words, in such a situation, user actions may also be considered part of the overall event signature used by the intelligent device to trigger certain actions or responses.

It has been determined that an analysis of forces applied to a container over a given period of time may be used to accurately determine when either a fork lift or a manually operated pallet moving device is being used to unload assets from a container and alternatively when a trailer type container is being attached to or detached from a tractor. It is even possible to determine whether it is being attached in a conservative manner such as would take place when stealing a container trailer in a truck stop or motel parking lot or the much quicker operation that takes place when a tractor-trailer is hijacked on the highway and only the trailer is taken. Other forces such as those occurring when a tire blows provide an event signature distinguishable from other forces that may be applied to an asset container. Thus the CPU in combination with the sensors may even analyze things like forces exerted upon a container over various periods of time to ascertain a positive comparison with like events used in the event signature library.

As one skilled in the art may deduce, the contemplated functionality can also be used to create a perceived level of situational awareness by the intelligent device. For example it would be possible to create a signature library relative to motion events over time that are typically associated with road travel by a truck trailer equipped with air-ride suspension. In addition a signature could be created for a truck trailer equipped with standard suspension. The intelligent device may then compare the subjected motion over a period of time to determine if the device is attached to an asset located inside an air-ride or standard trailer. In many cases cargo owners may pay additional funds to ensure that their loads are transported only with air-ride equipped trailers. Thus the device may be designed to use the process of event signature capture and comparison to determine if the goods were indeed shipped on a trailer with the appropriate specifications and either log that data in memory for later use by a customer or alternatively immediately notify the cargo owner of the discrepancy where product damage may well occur with respect to an asset to which the device is attached.

Reference will now be made to FIG. 4 in combination with FIG. 1 for a device that is to report that it is likely the container or assets within the container to which the device was at least originally attached have been or are in the process of being stolen. As shown, the sensors are used to determine, in the first column whether or not the device is physically located within one of a set of locations predefined as stopping points during a trip between source and final destination. These points could be truck stops, motels normally used and so forth. A second event signature, as shown in the second column of FIG. 4 may be the forces typically occurring when the trailer is disconnected from the tractor. The third column represents the event signature of a "soft" or minimal noise connection of a trailer to a tractor while the fourth column the event signature of a "hard" or very fast and usually noisy connection of a trailer to a tractor. In a manner similar to that occurring in connection with FIG. 3, the fifth and sixth columns represent respectively the event signatures of the container door being opened and the device being removed from the container. The seventh column represents the event signatures occurring when pallets are moved either using manually operated lifts or powered forklift type apparatus. The eighth column represents the situation where the device determines that it is physically located at the predefined destination location for the container to which the device has been attached. The ninth column in this chart represents whether or not the device is physically located within a predefined geofence for the source to destination trip of the container. Finally, the tenth column represents the action to be taken by the device when presently sensed event signatures coincide with a set of event signatures in the library as set up in FIG. 4.

The first row set of event signatures represents the situation where the sensors indicate that it physically located in one of a set of predefined trip locations such as motels, truck stops and so forth, that it is within a predefined geofence for that trip and that the destination has not been reached. If any one or more of the event signatures set forth in columns 2 through 7 are detected before arriving at the scheduled destination, a notification is typically returned to the central CPU 114 of FIG. 1. If there was a breakdown of the tractor or something occurred whereby the trailer needed to be opened, the truck driver normally would notify someone in authority that was remotely monitoring the situation and depending upon all the accompanying data supplied with the notification, the entity monitoring the situation may or may not notify law enforcement personnel or attempt to provide independent verification of whether or not a theft situation is occurring. Alternatively, the driver could notify a central station that the tractor is being disconnected for a given period of time while the driver eats and/or sleeps and further notifications can be scanned with that data in mind. On the other hand, the device could be remotely altered to notify only if certain event signatures were detected during the period of time that the driver indicated that the container would be parked such as if the container is opened or a soft connection is detected. Likewise, the device can readily be programmed to always notify law enforcement authorities, upon detection of certain conditions, as set forth in the action column in addition to notifying a central station. In view of the location determination capabilities of the device, the law enforcement notification could be readily directed to the closest highway patrol office, local Sheriff and so forth.

The second set of event signatures are similar to the first except that the physical location of the device, whether or not still attached to the container, is not at a trip location where the container might normally be parked for a given period of time. In such a situation, the event signatures might include, in addition to those shown, movement or lack thereof along with all known traffic light and road repair locations. If the container is stopped at a location other than those predefined, a reasonable action, although not specifically shown in the chart of this figure, by the device may well be to notify the central CPU 114 and require that the driver be contacted to ascertain the reason for being stopped.

For some event signatures, it may be desirable to define a positive compare when the compare falls within a given range of a typical event signature data set. Such a situation is expanded upon in connection with FIG. 6. In other situations, the comparison process may involve a probability calculation of whether a given set of data is likely to compare to a set of stored event signatures and when the probability is above a certain level, (even though all normally required signatures do not compare) an action may be taken to notify that probability. In cases where event signatures occur over a long period of time it may be desirable to notify the user that a particular event is possibly occurring although the entire signature is not met. For example perhaps a particular theft event signature involves many readings over a 2 hour time window. In this assumed event, if the device detects that such a signature has a high probability of a match after 1 hour it may be advantageous to inform the user prior to the full 2 hour time window that such an event is possibly occurring.

The final row of event signature conditions illustrated represents the device determining that it is at the destination. The X's being an indication that any given event signature can be ignored. However, the notification, once the container is at the destination, could be set up to notify for special non-theft related situations such as only if the container is open and the wrong type of pallet lift is used to remove fragile material. As may be noted, a blank row is presented as an indication that many more sets of event signatures may be in a given library and the previously discussed sets are merely exemplary in nature.

Although not specifically shown in the high level flow diagram of FIG. 2, the software may be readily modified to perform sensor sampling and analysis functions more often when one or more given event signatures detected is logically indicative of a given situation likely to be occurring. The forces involved in coupling or decoupling of the tractor from the container or trailer are very large and readily discernible. If a tractor is decoupled from the container or trailer at a location that such should not typically occur and especially if a decoupling is quickly followed by a coupling, the chances are high that that theft of goods from the container is about to occur. Thus the smart device logic may appropriately include logic that increases the sampling rate of the sensors upon the detection of such an event to increase the accuracy of correlation determination for any further detected events.

In FIGS. 5A and 5B, graphs are shown representing detected and calculated forces occurring for a specific tractor and trailer combination when first coupling and then decoupling. In each graph the horizontal axis represents time and the vertical axis represents force magnitude. Since, a package to which a smart device is attached may be in any of many orientations especially when being transported, it is essential that forces be measured in the X, Y and Z directions and then combined and normalized into a magnitude value. Accelerometers are available that can provide indications of these forces after removing the effective forces of gravity. As known to those skilled in the art, many other force sensors may also be used in the three different axis to obtain data indicative of motion and the gravity forces may readily be neutralized from the data by known computational algorithms. As shown, the three orthogonal forces are indicated by three different types of dash lines. For clarity, each sampling point, as shown in the example illustrated, is 1 time unit apart. At some point between the 2nd and 3rd sampling point, the container in which the smart device is located commences being coupled to a tractor. Thus the forces detected in the Y and Z directions, at the 3rd sampling time, changes by a large amount and the change in the X direction by a much smaller amount. As shown in FIG. 5B, the normalized value increases greatly at the 3rd sampling point. The detected forces have decreased somewhat at the 4th sampling point and returned to a much smaller value at the 5th sampling point which occurred some place during the transition between a coupling process and an immediately subsequent decoupling process. As shown, the decoupling process forces detected at the 6th sampling point, similar in normalized magnitude to that obtained for the coupling process. There is a decrease in normalized magnitude shown for the 7th sampling point before returning to near zero for the 8th sampling point.

Thus, as shown in the illustrated example, both a coupling and a decoupling can occur within 6 sampling points when the smart device is set in a sampling condition to conserve battery power. However, the software may include logic to increase the sampling rate upon an extreme increase in detected forces to increase the accuracy of determination of an event being within predefined tolerances of determination that a detected event signature coincides with an event signature stored in a library of event signatures. Alternatively, or in addition, the device may include logic to increase the sampling rate upon the detection of any one of several event signatures that may well be associated with a given set of conditions indicating completion of a job function.

As will be realized, the event signature of a given situation will vary to some extent in accordance with many factors. Referring specifically to the coupling and decoupling of tractor and trailer mentioned in connection with FIG. 5, the signature will vary with different tractor operators. It will vary even more over many different combinations of tractors, trailers and the type and weight of loads in the trailers. Thus if a given smart device is intended to operate with many different event signature combinations, it will be desirable to have a range of values that may be used to establish a given event signature. It is also contemplated that the library of event signatures may optionally be constantly updated for some or all smart devices based upon data gathered from deployed devices. This continuous update process may be used to ensure that all the various factors contributing to a particular event signature are up to date.

In FIG. 6, an expansion of the graph of FIG. 5B is presented. After examining a large number of tractor trailer combinations and their event signatures as recorded from actual theft situations, it may be determined that there is a given percentage probability that any detected string of force measurements resulting in a graphical representation falling between the illustrated dash line upper and lower limits constitutes a coupling or decoupling event.

As will be evident to those skilled in the art of wave analysis and/or pattern recognition, the above narrative relative comparison of event signature is presented in graphical format for ease in describing the concept. However, for event signature comparison of certain signals like the forces described supra, the actual comparison would occur using the data obtained from any given series of force measurements. Typically this data comprises a plurality of frequency components of various magnitudes that can be readily compared to one or more other sets of frequency components used as standards to establish event signatures.

It should be noted that, while the preferred embodiment of this invention, if response quickness is a prime consideration, is to have event signature processing, event signature library storage and event signature comparison all occurring within a given smart tag, any or all of these items may be accomplished remotely. In other words, if desired, the sensed data may be retrieved by tag 100 of FIG. 1, sent to a remote unit, such as CPU 114, processed to form an event signature, compared with a library of event signatures stored in block 114 or elsewhere. When remote computations are completed, the remote unit may then generate a response that is sent back to tag 100. Tag 100 can then use the received response as an instruction to proceed to a normal next or different further action.

The accuracy of event signatures and sets of event signatures in a library may be increased by modifying given event signature parameters as a function of data obtained from situations recorded by the device as "on the job" events.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. RF tag apparatus comprising:
   a RF transmitter operable to communicate with a remote central computer over a network;
   a plurality of sensors operable to provide output signals indicative of sensed parameters;
   a CPU, connected to said RF transmitter and said plurality of sensors; and
   CPU programming means operable to compare event signatures representative of signals received from said plurality of sensors with previously stored event signatures to determine when completion of use has occurred and upon the occurrence of a positive determination to subsequently cause transmission of data to initiate pickup procedures of said RF tag apparatus.

2. Apparatus as claimed in claim 1 wherein said apparatus comprises
   an RFID tag;
   attachment means for attaching said tag to an asset; and
   memory storage means having at least one event signature indicative of completion of use.

3. Apparatus as claimed in claim 1 wherein said CPU programming means is operable, in combination with said RF transmitter to retrieve at least one of sets of event signatures from remotely situated memory storage and remotely generated responses to remotely compared presently generated event signatures with remotely stored event signatures.

4. The apparatus of claim 1 wherein said apparatus includes:
   location circuitry operable to determine present location of said tag;
   means operable to retrieve destination location data;
   interconnection means whereby said CPU is connected to receive present location data from said location circuitry; and
   instructions in said CPU programming means whereby said event signature set of data indicative of completion of use includes events indicative of forces typically applied to a RF tag over a period of time subsequent to being received at a scheduled destination.

5. Theft detection apparatus comprising:
   a RF transmitter operable to communicate with a remote central computer over a network;
   at least one sensor operable to detect at least one of magnitude and direction of forces to which said apparatus is subjected while being attached to one of a container and an asset;
   a CPU, connected to said RF transmitter and said at least one sensor; and
   CPU instructions operable to compare event signature signals representative of sensed force data received with previously stored event signatures indicative of forces typically applied to said apparatus while attached to an asset or container during illegal removal of goods in different theft and/or container situations to determine when it is probable that an illegal removal of goods is occurring and upon the occurrence of a positive determination to subsequently cause transmission of data to notify appropriate authorities.

6. The apparatus of claim 5 wherein said apparatus comprises an attachable tag and includes:
   location circuitry operable to determine location of said tag;
   memory storage means including at least destination location data;
   connection means whereby said CPU is connected to receive present location data from said location circuitry; and
   instructions in said CPU programming means whereby said CPU uses said location data as part of the data transmitted to the appropriate authorities.

7. The apparatus of claim 5 wherein:
   said CPU is operating to use detected present tag location data in determining contact data for law enforcement authorities near the detected present tag location; and
   law enforcement authorities are included in the notification transmission of data.

8. The method of automating a communication to authorities that theft of assets from and/or in a container is probably occurring by a device attached to said container comprising:
   monitoring signatures of movement events to which said device is exposed;
   monitoring location of said device as a sensed event;
   comparing event signatures representative of sensed data with a library of at least one set of event signatures;
   determining theft of assets is likely occurring when the comparison of recently collected event signatures positively compares with a given set of event signatures in said library; and contacting, through M2M communication, appropriate authorities that theft of assets is likely occurring.

9. The method of claim 8 comprising in addition:
activating countermeasures to aid in minimizing the probability of a successful theft of assets subsequent to a determination that theft of assets is likely occurring.

10. RF tag apparatus comprising:
a RF transmitter operable to communicate with a remote central computer over a network;
at least one force sensor operable to detect at least one of magnitude and direction of forces to which said apparatus is subjected that result in motion of said tag apparatus;
a CPU, connected to said RF transmitter and said at least one sensor; and
a CPU instruction set operable to analyze motion data as detected by and received from said at least one force sensor, to generate event signature data as a function of the analysis of the motion data, and to then compare generated event signature data to a library of stored motion data event signatures for deriving a logical conclusion as to the status of said tag apparatus.

11. The apparatus of claim 10 wherein the motion analysis performed by said CPU instruction set comprises at least one of wave analysis and pattern recognition.

12. The apparatus of claim 10 wherein said CPU instruction set additionally includes instructions for initiating the sending of data to a given entity over a network upon a likely positive comparison with a given event signature in said library of event signatures.

13. Theft deterrent apparatus comprising:
an asset container;
theft deterrent apparatus attached to said asset container;
motion detection circuitry operable to detect motions of said container consistent with motions occurring upon removal of assets from said container;
location determining circuitry; and
logic circuitry connected to receive output signals from said motion detection circuitry and said location determining circuitry, said logic circuitry being operable to activate said theft deterrent apparatus when said logic circuitry determines that assets are being removed at a location inconsistent with normal location asset removal sites.

14. A method of deterring theft of assets from a moveable container comprising:
incorporating theft deterrent apparatus with an asset container;
detecting motions of said container consistent with motions occurring upon removal of assets from said container;
determining present location of said moveable container; and
activating said theft deterrent apparatus when said logic circuitry determines that assets are being removed at a location inconsistent with normal location asset removal sites.

15. A method of determining completion of function of a device comprising:
monitoring conditions to which a device is exposed;
comparing a plurality of recently collected event signatures obtained as a result of the condition monitoring with a library of at least one set of event signatures;
determining the function has been completed when the comparison of recently collected event signatures positively compares with a given set of event signatures in said library; and
initiating a new job function in accordance with the specific library event signature comparison.

16. The method of claim 15 wherein a least one of the conditions monitored comprises sensed forces to which a device is exposed, location of said device as determined by said device and movement of said device as determined by said device.

17. The method of claim 15 wherein:
the at least one set of event signatures is related to a at least potential theft situation; and
the new job function that is initiated includes wireless transmission of data relating to the at least potential theft situation to an authorized entity.

18. RF tag apparatus comprising:
a RF transmitter operable to communicate with a remote central computer over a network;
at least one force sensor operable to detect at least one of magnitude and direction of forces to which said apparatus is subjected that result in motion of said tag apparatus;
a CPU, connected to communicate with said RF transmitter, said at least one force sensor and said at least one further sensing device; and
a CPU instruction set operating to initiate an analysis of motion data as detected by and received from said at least one force sensor a period of time, to initiate generation of event signature data as a function of an analysis of the motion data over said period of time, and to then initiate comparison of generated event signature data to a library of stored motion data event signatures for deriving a logical conclusion as to which, if any, of the stored motion data event signatures is substantially comparable to the presently generated event signature data.

* * * * *